United States Patent Office 2,732,323
Patented Jan. 24, 1956

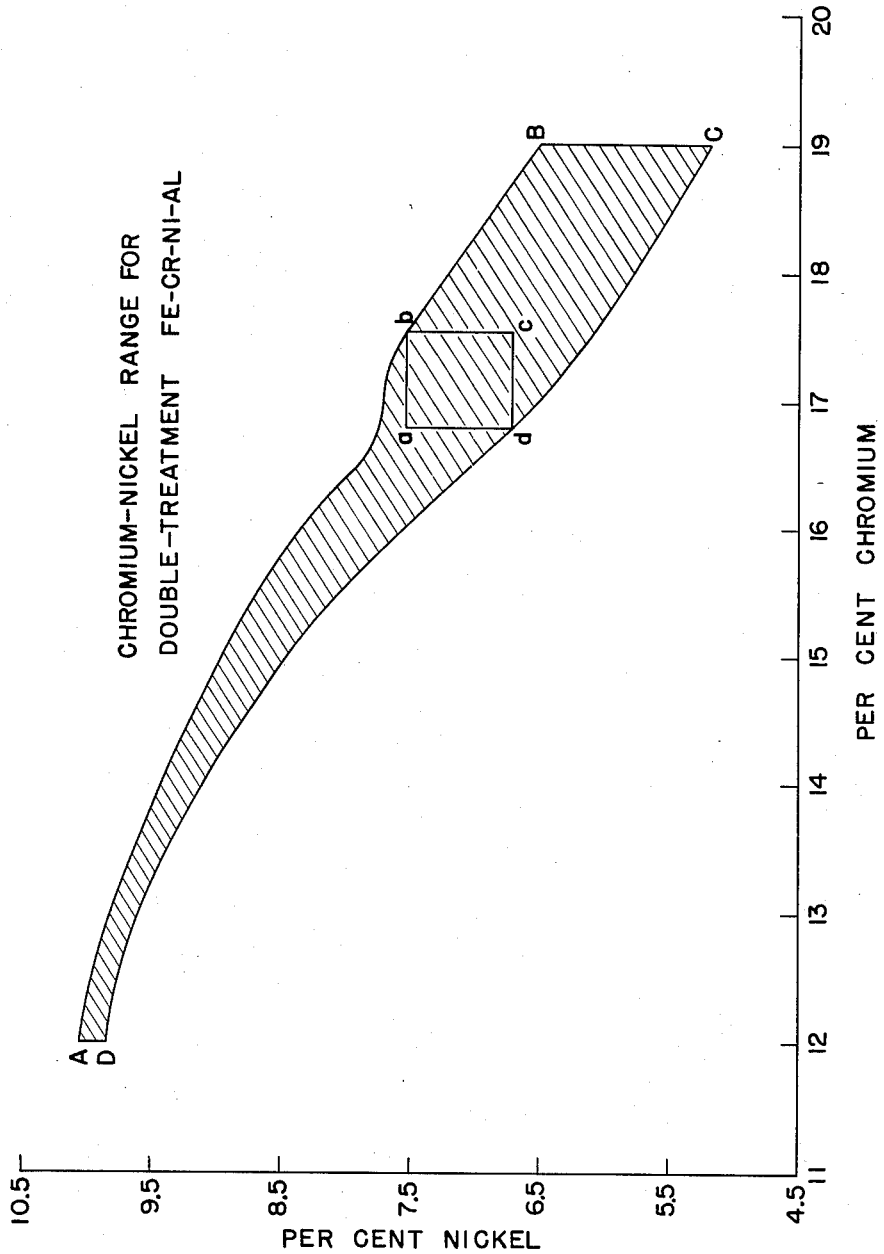

2,732,323

PROCESS OF WELDING AND HEAT TREATING STAINLESS STEEL

George Edwin Linnert, Baltimore, Md., assignor to Armco Steel Corporation, a corporation of Ohio Application December 6, 1951, Serial No. 260,138

7 Claims. (Cl. 148—21.54)

My invention relates to stainless steel welded articles, more particularly precipitation-hardened stainless steel welded articles and a method of fabricating the same.

An object of my invention is to provide precipitation-hardened stainless steel welded articles in which the welds are of desired high strength and possess required ductility, which welds are readily formed in direct, certain and predictable manner at minimum expense and cost of time, labor, plant and materials, all with only moderate warping or distortion, readily corrected, and with minimum scale production, itself readily removable.

Another object is to provide a method of satisfactorily welding precipitation-hardenable stainless steels which is at once simple, direct and certain in results, in which welds of high strengths are achieved with requisite ductility, and with substantial elimination of undesired softness therein, but in which only moderate hardness is produced in the weld nugget; and in which tendency towards warping or distortion of the metal due to exposure to high temperatures is substantially minimized, such warping as is produced being removed comparatively readily; and in which the degree of mechanical support which is required during the heat-treatments is minimized even though the parts to be welded have substantial size and complexity; all with minimum surface scaling, readily removable in simple, ready and direct manner.

Yet another object is the provision of a reliable and commercially practical method of welding stainless steels which are precipitation-hardenable by double-heat-treatment, as well as the resulting joint, which joint is strong and durable and possesses reasonable ductility, at the same time being substantially free from disortion and objectionable scale.

Other objects and advantages will be obvious in part and in part pointed out hereinafter.

My invention accordingly resides in the combination of elements, features of construction, and in the various operational steps and the relation of each of the same with one or more of the others, all as described herein, the scope of the application of which is more fully indicated in the accompanying claims.

In the drawing, the single figure graphically represents proportions of chromium and nickel which are at times employed in the composition of the stainless alloy steel of the welded articles and method in accordance with the practice of my invention.

As conducive to a more ready understanding of my invention, it may be noted that the use of the more commonly known 18–8 chromium-nickel grades of stainless steel has been somewhat limited, despite their many highly desirable characteristics, due in large measure to the fact that these steels, remaining stably austenitic at room temperatures after quenching from annealing temperature, were in no manner hardenable by heat-treatment. While it is true that steels of this general type were work-hardenable, this property could not always be relied upon for the satisfactory provision of hardened products.

More recently, however, there has been made available a series of precipitation-hardening stainless steels. Illustratively, George N. Goller, in a number of patents, Serial Nos. 2,505,762, 2,505,763, 2,505,764 and 2,506,558, has disclosed certain aluminum-containing austenitic chromium-nickel stainless steel methods for the successful precipitation-hardening of the same.

In accordance with the teachings of the Goller patents, a stainless steel of composition shown by the abscissa and ordinate of any given point of area ABCD of Figure 1 in the present disclosure, and which is patterned after the Goller disclosure of the Patent 2,505,763, will contain in chromium ranging from about 12% to as high as 19% while the nickel may range from as low as 5% to as high as 10%. As well, in such steels carbon may typically range from about 0.02% to about 0.12%, aluminum from about 0.50% to about 2.50%, from incidental amounts up to about 8.0% manganese, from incidental amounts up to approximately 2.0% silicon, all with or without molybdenum ranging up to about 3.0% to enhance the corrosion resistance of the steel. The remainder is substantially all iron.

Steels of the general type noted have rapidly come into widespread use. Particularly, in sheet form they are used in the construction of aircraft as well as in a number of other highly diversified products. In their fabricated form, however, it is frequently necessary to secure component parts together as by welding in one form or another. This is a technique which ordinarily would be resorted to.

Much to the surprise of those working in the art, however, upon resistance-spot-welding the precipitation-hardening steels of double-heat treatment type the results encountered were found to be erratic and unpredictable. As might be expected, upon initially undertaking the welding of these steels resort was first had to resistance-spot-welding the products while these latter were in annealed condition. The products then were subjected to the two-stage, intermediate and final hardening heat-treatments. However, and as has been suggested hereinbefore, the investigators were much surprised to find that upon such treatment, and with both the weld nugget and the base metal hardened through heat-treatment, the overall results were poor, erratic, and unpredictable. These investigations disclosed that the nugget of weld metal in the "as welded" condition had mechanical properties comparable to those of annealed base metal, and that the nugget responded to the double heat-treatment the same as did the annealed base metal. In hardened condition the weld displayed a low tensile strength and as well, low strength in shear. It was brittle and had low ductility. Upon testing, failure in the weld quickly occurred. The conclusion was reached that the hardened weld nugget was bad.

An important object of my invention is to suppress, and if possible, to eliminate, the many difficulties and disadvantages heretofore confronting the art, and at the same time to produce in ready, simple and direct manner, involving minimum operational steps, resistance-spot-welded and resistance-seam-welded precipitation-hardenable stainless steel articles, and welded joints in the same, which joints, in their final form, display high strength and requisite ductility, and this with minimum difficulty in manufacture from warping or heat distortion, scale formation or the like.

And, having reference to the practice of my invention, I have found that best results are achieved and high joint strength obtained when the sequence of welding operations and the hardening treatments are such that an intermediate heat-treatment is applied to annealed base metal responding to the general analysis heretofore given, while the latter still is in non-assembled component parts. These latter possibly have been subjected to fabricating steps, but have not yet been assembled in unitary form. The various parts then are assembled in proper manner and subjected to spot-welding, conveniently while being held in a suitable jig or fixture. Finally, the spot-welded assembly is subjected to the low temperature precipitation-hardening step.

I have found that such a method can be included in ordinary fabrication operations without difficulty, and with immediate, direct and effective realization of the desired and characteristic resistance-spot-welded joints in double heat-treatment precipitation-hardening stainless steels. Furthermore, in this preferred embodiment I find that the low temperature precipitation-hardening step improves the weld by providing some moderate and desirable increased hardness in the strength of the weld nugget, without any substantial decrease in its ductility.

As a further point, emphasizing the characteristic advantages attending the practice of my method, I find, particularly when dealing with parts formed of lighter gauge sheet metal, that the intermediate heat-treatment in the neighborhood of 1400° F. is frequently accompanied by detrimental warping or distortion. With this in mind it will be seen that if, now, the metal is first spot-welded completely and is then double heat-treated, it is essential that the assembled parts, prior to welding, be provided with careful support or bracing to avoid undue distortion at the prevailing elevated temperature. Moreover, I find that the resulting weld is detrimentally brittle. The warping which does occur is increasingly difficult to remove, depending upon the size and shape of the welded assembly.

On the contrary, where the component pieces are first fully hardened by double heat-treatment and only then subjected to spot-welding, any distortion resulting from the spot-welding is difficult to remove. This is due both to the high yield strength of the precipitation-hardened metal and to its limited ductility.

I have found that markedly improved results attend the practice of my invention wherein the formed parts of precipitation-hardenable stainless steels, are subjected to intermediate heat-treatment to a temperature in the neighborhood of 1400° F. for a time sufficient to transform the metal, this effecting a precipitation of carbides and the development of a martensite-like constituent—see Goller Patent 2,505,763 referred to above. Illustratively, and in a preferred embodiment, I employ sheet metal analyzing: chromium about 17%, nickel about 7%, aluminum about 1.0% to 1.3%, carbon about .06% to .08%, remainder iron. It will be seen that this range corresponds rather closely to the abscissa and ordinate range as given by the area abcd of the drawing. This metal is known in the trade as Armco 17-7 PH stainless steel.

Relying upon standard test practices in my researches, I employ those recommended by the Resistance Welding Committee of the American Welding Society. Accordingly, I use the standard type spot-welded specimens following their recommendations. By so doing I am enabled properly to evaluate both strength and ductility of the specimens according to standard test practices and patterns. Three tests were employed.

One such test was the so-called tension-shear test. Following this practice I over-lapped two small pieces of sheet metal and joined them by a simple spot-weld. Each such sheet was then gripped in a tensile test machine. Load was then applied until the weld failed in shear.

In the second such test I used the U-tension test specimen. In this test I bent small strips of sheet metal of required analysis into U-shape with 90° corner bends. I joined two such U-shaped pieces bottom-to-bottom by a single spot-weld. Upon mounting this assembly in a jig and subjecting the same to increasing tensile load, the same failed in pure tension.

In both tests, the loads producing the failure were recorded as the weld strengths. The ductility of the spot-weld was indicated rather closely by the ratio of the tensile strength to the tension-shear strength, a high ratio indicating good ductility.

Finally, I tested a wire of one-quarter inch diameter by crossing straight lengths thereof at 90° and spot-welding at the point of intersection. The joint thus produced was tested in pure tension.

The specimens were thereupon examined and the results thus achieved according to such tests are presented in the following table:

TABLE I

Results of Standard Tensile and Tensile-Shear Tests on Resistance Spot-Welded Specimens of ARMCO 17-7 PH Stainless Steel

[Values are averages obtained from triplicate specimens]

| Procedure for Specimen Preparation | Sheet .019" Thick | | |
|---|---|---|---|
| | Tensile Strength, Lbs. | Tensile-Shear Strength, Lbs. | Tensile to Tensile-Shear Ratio |
| (1) Spot Weld, Intermediate Heat Treat. 1,400° F., Final Heat Treatment 900° F | 78 | 592 | .13 |
| (2) Intermediate Heat Treat. 1,400° F., Final Heat Treatment 900° F., Spot Weld | 347 | 982 | .35 |
| (3) Intermediate Heat Treat. 1,400° F., Spot Weld, Final Heat Treatment 900° F | 493 | 1097 | .45 |

| | Sheet .043" Thick | | |
|---|---|---|---|
| (1) Spot Weld, Intermediate Heat Treat. 1,400° F., Final Heat Treatment 900° F | 308 | 1,632 | .19 |
| (2) Intermediate Heat Treat. 1,400° F., Final Heat Treatment 900° F., Spot Weld | 1,757 | 1,997 | .88 |
| (3) Intermediate Heat Treat. 1,400° F., Spot Weld, Final Heat Treatment 900° F | 1,762 | 2,158 | .82 |

| Procedure for Specimen Preparation | Sheet .065" Thick | | | ¼" wire |
|---|---|---|---|---|
| | Tensile Strength, Lbs. | Tensile-Shear Strength, Lbs. | Tensile to Tensile Shear Ratio | Tensile Strength, Lbs. |
| (1) Spot Weld, Intermediate Heat Treat. 1,400° F., Final Heat Treatment 900° F | 540 | 3,739 | .15 | 1,496 |
| (2) Intermediate Heat Treat. 1,400° F., Final Heat Treatment 900° F., Spot Weld | 2,776 | 4,047 | .69 | 4,210 |
| (3) Intermediate Heat Treat. 1,400° F., Spot Weld, Final Heat Treatment 900° F | 3,020 | 4,305 | .70 | 4,280 |

Table I summarizes the results of three series of tests, carried out respectively on sheets of precipitation-hardenable stainless steels of 0.019, 0.043 and 0.065 inch thickness. Additionally, each series of tests involved three parts. In the first series of tests the specimens were joined by spot-welding, and this was followed by intermediate heat-treatment at 1400° F. and by final heat-treatment at 900° F. In the second series, this giving surprising results, the intermediate heat-treatment at 1400° F. was first employed, followed by final heat-treatment at 900° F., and finally by spot-welding. It is the third series which I find to give the most surprising and best results, this treatment involving intermediate heat-treatment at 1400° F. followed by spot-welding, and then by a final heat-treatment at 900° F.

As has been suggested hereinbefore, the series of tests carried out for the production of the data from which Table I has been compiled, discloses that the nugget of weld metal in the "as welded" condition possesses mechanical properties comparable to those of the annealed base metal, and that as well, the nugget responds to the double heat-treatment substantially the same as does the annealed base metal.

When the precipitation-hardenable alloy was spot-welded in the annealed condition, and then subjected to the intermediate and final hardening heat-treatments, as in the first series of tests, I found that both the nugget of weld metal and the base metal itself were hardened. I further found that when the weld nugget was in the hardened condition as thus produced, stress concentration increased in importance and failure of the joint occurred at relatively low tensile load, this in the neighborhood of 78 pounds. Additionally, the ratio of tensile strength was low, .13, indicating poor ductility.

On the other hand, in the second series of tests, wherein the pieces were spot-welded only after the base metal had been fully hardened by the double heat-treatment, the weld nugget was retained in the soft or "as welded" condition. In this instance the joints displayed higher weld strength and better ductility. Illustratively, as compared with the 78 pound's tensile strength exhibited in the first series, the weld joint in the second series displayed a tensile strength of 740 pounds and a tensile-shear strength of 982 pounds, with a ratio therebetween, indicative of ductility, of .35.

However, and as I have stated hereinbefore, the highest joint strength was obtained according to the third series of tests, wherein I first applied the intermediate heat-treatment to the annealed base metal, and then carried out the spot-welding operation. Thereafter, and as a final step the welded products, comprising the spot-welded assembly, was subjected to the low temperature final heat-treatment. The results disclosed that this final heat-treatment exerted a powerful and beneficial result on the weld, inasmuch as it promoted a small increase of hardness and strength of the nugget, while at the same time it did not reduce the ductility as compared to the second series of tests. As a matter of fact it will be seen that in several instances the ductility ratio in the third series, .45, is slightly greater than that observed in the second series of tests.

Most of the foregoing has been directed to the strength produced according to the practice of my invention. Additionally, however, I find that the intermediate heat-treatment at 1400° F. quite frequently tends to cause warping or distortion of the sheet materials, particularly in the lighter gauge metals. Thus if an assembly be completely spot-welded and then double heat-treated, as in the first series of tests, the welded assembly will require careful support or bracing during the course of the intermediate heat-treatment to minimize the distortion resulting. Any warpage which does occur may be difficult to remove, depending upon the size and nature of the assembly.

Similar observations were made in accordance with the practice in the second series of tests, wherein the component pieces were first fully hardened, through double heat-treatment and thereafter spot-welded. Here it was observed that any distortion that occurs in the assembly because of the spot-welding operation will likewise be difficult to remove. This is perhaps due to the high yield strength of the material and to its limited ductility.

I found that an altogether different situation existed in accordance with my preferred procedure, forming the basis of the third series of tests. Therein the component parts of the sheet material are first prepared, and these pieces while still in separate form are subjected to the intermediate heat-treatment at 1400° F. It is a simple matter, so I find, to support these separate pieces during such heat-treatment, and any warpage which does occur may be dealt with more efficiently, with the elements in their individual pieces. Such correction is accomplished, illustratively, by re-striking them with the original forming die or forming tool. Only following such intermediate heat-treatment are the separate pieces joined together by resistance-spot-welding. Any distortion taking place as a result of the welding operation can be readily corrected because the material is still at an intermediate hardness level and has adequate ductility to withstand mechanical straightening. Finally, when the final hardening treatment is applied at about 900° F. warpage no longer constitutes a problem.

No consideration has as yet been given, in the course of this disclosure, to the removal of surface scale. Important advantages attend upon the practice of my invention in this connection. For the removal of surface scale formed by the heat-treating operation is also facilitated by applying my new method.

Pickling in acid solution is the method most commonly used for the removal of surface oxide or scale from stainless steels. De-scaling is important in that the presence of scale on the surface of stainless steels generally decreases the resistance to corrosion. Investigations show that the scale which forms on the steel of the general types undergoing discussion as a result of the intermediate treatment at about 1400° F. can be more readily removed by pickling if this pickling operation is performed prior to the treatment at 900° F. For it is found that exposure to the final heat treatment at about 900° F. in some manner apparently alters the response to pickling.

In following my fabricating method, the component pieces are treated at about 1400° F., and then pickled. I find that through performing this pickling operation at this stage in the method, scale removal is easier, a cleaner surface is produced suitable for subsequent spot-welding, and the absence of any scale in crevices is insured. The component parts are then spot-welded, following which the assembly is subjected to the 900° F. hardening treatment. Such final exposure at about 900° F. does not produce a surface scale, but merely a light brown discoloration which does not affect the resistance to corrosion. This discoloration may be permitted to remain if desired, but if excellent color is required, the discoloration can be readily removed by a flash pickle.

My new method of weld-joint preparation enhances the desirability of using double heat-treatment precipitation-hardenable steels in the fabrication and assembly of many spot-welded articles where high strength and resistance to corrosion are required and the production of which heretofore has been unavailable. The applications of such practices are manifold. Illustratively, spot-weld joints of maximum strength are advantageous, in such articles as plaster and cement trowels, sheet metal components of aircraft jet engines, shells for rockets or guided missiles, carpenters' back saws, pressure clamps and many others, of which those listed are merely typical.

It will be seen from a consideration of the foregoing that best results are achieved when the welding operation is interposed between the intermediate and final heat-treatments of the double heat-treatment precipitation-hardening of stainless steels, but that this is closely approached by performing the welding operation following the double heat-treatment. The best results are attendant upon those conditions where the spot-welds are slightly hardened without appreciable increase in ductility.

While, as illustrative of the practice of my invention, as given above, I employ an intermediate heat-treatment at a temperature of about 1400° F. I find that good results are had where the temperature of this heat-treatment ranges from about 1200° to 1600° F. and, similarly, while I illustratively employ a final heat-treatment at a temperature of 900° F., as noted, good results are achieved where the temperature of this final treatment ranges from about 700° to 1200° F.

It will be seen from the foregoing that welding in accordance with my present disclosure enables the realization of satisfactory, certain and predictable results, making the stainless steels precipitation-hardenable by double heat-treatment, available through widely spread fields. Moreover, necessity for support of the various component parts during heat treatment is appreciably minimized, while warpage and distortion no longer present serious problems. Such warping as does occur can be readily corrected. An additional important advantage is that scale production is maintained at a minimum, and its removal facilitated. Final color can be nicely controlled, and improved corrosion-resistance is observed.

Thus in my invention there is provided both a method and a resulting welded product and joint in which the various objects hereinbefore noted are successfully achieved, together with many other thoroughly practical advantages. My method makes possible the provision of intricate fabricated products welded from wrought or cast chromium-nickel-aluminum stainless steels which have been subjected to any number of forming, machining or fabricating operations. Moreover it enables the production of welded joints, characterized by their strength, ductility and close adherence to dimensions. My new method permits the production of the fabricated products with minimum number of auxiliary treatments such as pickling, and otherwise is quite suited for commercial use. The products produced according to the practice thereof display a high degree of hardness, together with high yield and ultimate strengths.

Since many embodiments may be made of my invention, all falling within the ambit of my disclosure, it is of course understood that all matters described herein are to be construed as illustrative, and not as limitations.

I claim as my invention:

1. In the fabrication of precipitation-hardened stainless steel articles of composition substantially in accordance with the area ABCD of the accompanying diagram and in which aluminum is the hardening alloy, the art which comprises, first heating the parts to be welded at a temperature of 1200° to 1600° F. and cooling; resistance spot-welding the parts; and thereupon heat-treating the fabricated and welded assembly at a temperature of 700° to 1200° F. and cooling.

2. In the fabrication of precipitation-hardened stainless steel articles of composition substantially in accordance with the area ABCD of the accompanying diagram and in which aluminum is the hardening alloy, the art which comprises, first heating the parts to be welded at a temperature of 1200° to 1600° F. and cooling; thereupon treating the same at a temperature of 700° to 1200° F. and cooling; and finally resistance spot-welding the hardened metal pieces into the desired article.

3. The method of producing welded joints of high strength and requisite ductility in precipitation-hardenable stainless steels in which aluminum is the hardening alloy and which analyze about 17% chromium, about 7% nickel, aluminum in the amounts between about 1.0% to 1.3%, about 0.06% to 0.08% carbon, and the remainder substantially all iron, and in which the metal has been brought to an aluminum-soluble austenitic condition stable down to at least about room temperature, which comprises the steps of transforming the pieces by heat-treatment within the approximate temperature range of 1200° F. to 1600° F. to effect carbide precipitation and quenching the same to achieve transformation; thereupon resistance spot-welding the pieces into fabricated form; and then heating the fabricated assembly of transformed metal within a temperature range of approximately 700° F. to 1200° F. for such period of time as is required to precipitate an aluminum compound and obtain a substantial increase in hardness of the products.

4. The method of producing welded joints of high strength and requisite ductility in precipitation-hardenable stainless steels containing chromium and nickel in amounts substantially in accordance with area ABCD in the accompanying diagram, comprising first transforming the fabricated metal pieces by heat-treatment at a temperature of 1200° to 1600° F. and cooling; thereupon resistance spot-welding the several pieces into a fabricated assembly; and finally treating the fabricated assembly at a temperature of 700° to 1200° F. for a time sufficiently long to precipitate an aluminum compound and obtain a substantial increase in the hardness of the metal.

5. In the fabrication of precipitation-hardened aluminum-bearing austenitic chromium-nickel stainless steel articles of chromium and nickel contents substantially in accordance with the area ABCD of the accompanying diagram, carbon between about 0.02% to 0.12%, and about .50% to about 2.50% aluminum, the art which comprises heating the parts to be welded at a temperature of 1200° to 1600° F. and cooling, thereupon re-heating the parts at a temperature of about 700° to 1200° F. and cooling; and resistance spot-welding the metal parts at a stage subsequent to said treatment at 1200° to 1600° F.

6. A fabricated metal article having resistance spot-welded joints and formed of aluminum-bearing austenitic chromium-nickel stainless steel of chromium and nickel contents substantially in accordance with the area ABCD in the accompanying diagram, carbon between about 0.02% and 0.12%, and about .50% to about 2.50% aluminum, spot-welded and heat-treated according to the method of claim 1.

7. A fabricated metal article having resistance spot-welded joints and formed of aluminum-bearing austenitic chromium-nickel stainless steel of chromium and nickel contents substantially in accordance with the area ABCD in the accompanying diagram, carbon between about 0.02% and 0.12%, and about .50% to about 2.50% aluminum, spot-welded and heat-treated according to the method of claim 2.

References Cited in the file of this patent

UNITED STATES PATENTS

| | | |
|---|---|---|
| 2,200,229 | Strauss | May 7, 1940 |
| 2,249,723 | Orr, Jr. | July 15, 1941 |
| 2,296,435 | Giard | Sept. 22, 1942 |
| 2,304,976 | Watter | Dec. 15, 1942 |